(12) United States Patent
Forsberg et al.

(10) Patent No.: US 10,828,976 B2
(45) Date of Patent: Nov. 10, 2020

(54) METHOD OF CONTROLLING A COUPLING ARRANGEMENT IN A GEARBOX

(71) Applicant: Scania CV AB, Södertälje (SE)

(72) Inventors: Jörgen Forsberg, Mariefred (SE); Kristian Ahlberg, Tranby (NO)

(73) Assignee: Scania CV AB, Södertälje (SE)

( * ) Notice: Subject to any disclaimer, the term of this patent is extended or adjusted under 35 U.S.C. 154(b) by 192 days.

(21) Appl. No.: 16/095,742

(22) PCT Filed: Apr. 21, 2017

(86) PCT No.: PCT/SE2017/050392
§ 371 (c)(1),
(2) Date: Oct. 23, 2018

(87) PCT Pub. No.: WO2017/188879
PCT Pub. Date: Nov. 2, 2017

(65) Prior Publication Data
US 2019/0210448 A1 Jul. 11, 2019

(30) Foreign Application Priority Data
Apr. 29, 2016 (SE) ...................................... 1650584

(51) Int. Cl.
*B60K 6/387* (2007.10)
*F16D 11/00* (2006.01)
(Continued)

(52) U.S. Cl.
CPC ................ *B60K 6/387* (2013.01); *B60K 6/48* (2013.01); *B60K 6/547* (2013.01); *B60W 10/02* (2013.01);
(Continued)

(58) Field of Classification Search
CPC .... F16D 11/14; F16D 2011/002; F16D 11/10; F16D 2800/14; B60W 10/02; B60W 10/08; B60W 6/387; B60K 6/387
See application file for complete search history.

(56) References Cited

U.S. PATENT DOCUMENTS 4,699,235 A * 10/1987 Anderson .............. B60K 17/35
180/247
6,008,606 A 12/1999 Arai et al.
(Continued)

FOREIGN PATENT DOCUMENTS

DE 10306641 A1 8/2004
DE 102006045732 A1 4/2008
(Continued)

OTHER PUBLICATIONS

Scania CV AB, International Application No. PCT/SE2017/050392, International Preliminary Report on Patentability, dated Oct. 30, 2018.
(Continued)

*Primary Examiner* — Sherry L Estremsky
(74) *Attorney, Agent, or Firm* — Moore & Van Allen PLLC; W. Kevin Ransom

(57) ABSTRACT

A method of controlling the coupling arrangement in a gearbox, comprising: displacing the coupling sleeve to the second position by applying a first force on the coupling sleeve in the direction from the first position to the second position, overcoming a spring force acting on the coupling sleeve in the direction from the second position to the first position; relieving the first force on the coupling sleeve when the coupling sleeve is in the second position, and when a reaction force acting on the coupling sleeve overcomes the spring force, which reaction force is a result of torque transferred by the third engagement means on the coupling sleeve; applying the first force on the coupling sleeve in the
(Continued)

direction from the first position to the second position, if the coupling sleeve is leaving the second position; and reducing the torque transferred by the coupling sleeve using the second power source.

10 Claims, 4 Drawing Sheets

(51) Int. Cl.
  *B60K 6/48* (2007.10)
  *F16D 11/14* (2006.01)
  *B60K 6/547* (2007.10)
  *B60W 20/40* (2016.01)
  *B60W 10/02* (2006.01)
  *B60W 10/08* (2006.01)

(52) U.S. Cl.
  CPC ............ *B60W 10/08* (2013.01); *B60W 20/40* (2013.01); *F16D 11/14* (2013.01); *B60K 2006/4825* (2013.01); *B60W 2510/0225* (2013.01); *B60W 2710/083* (2013.01); *F16D 2011/002* (2013.01)

(56) References Cited

U.S. PATENT DOCUMENTS

| | | | |
|---|---|---|---|
| 8,989,930 B2* | 3/2015 | Sah | B60K 6/387 701/22 |
| 9,518,621 B2 | 12/2016 | Andersson | |
| 2001/0024996 A1 | 9/2001 | Sugano | |
| 2008/0022792 A1 | 1/2008 | Robinson | |
| 2008/0293542 A1 | 11/2008 | Alfredsson et al. | |
| 2012/0152049 A1 | 6/2012 | Benson et al. | |
| 2013/0112522 A1 | 5/2013 | Granzow et al. | |
| 2013/0334001 A1 | 12/2013 | Albrecht et al. | |
| 2014/0329640 A1 | 11/2014 | Helmer et al. | |
| 2017/0001627 A1 | 1/2017 | Lindstrom et al. | |
| 2019/0093712 A1* | 3/2019 | Forsberg | F16D 11/10 |

FOREIGN PATENT DOCUMENTS

| | | | | |
|---|---|---|---|---|
| DE | 102011080522 A1 | 2/2013 | | |
| DE | 102011119312 A1 | 5/2013 | | |
| DE | 102011085839 A1 | 8/2013 | | |
| DE | 102014204909 A1 | 9/2015 | | |
| EP | 566923 A1 | 10/1993 | | |
| EP | 1876422 A1 | 1/2008 | | |
| EP | 2500694 A2 | 9/2012 | | |
| EP | 2568192 A1 | 3/2013 | | |
| GB | 747400 A | * | 4/1956 | ............ F16D 21/04 |
| GB | 1345160 A | 1/1974 | | |
| JP | 2003202244 A | 7/2003 | | |
| JP | 2007114090 A | 5/2007 | | |
| JP | 2013243834 A | 12/2013 | | |
| SE | 1451654 A1 | 6/2015 | | |
| WO | 2007061348 A1 | 5/2007 | | |
| WO | 2007102762 A1 | 9/2007 | | |
| WO | 2013020734 A1 | 2/2013 | | |
| WO | 2013176107 A1 | 11/2013 | | |
| WO | 2014098657 A1 | 6/2014 | | |
| WO | 2015055339 A1 | 4/2015 | | |
| WO | 2015183159 A1 | 12/2015 | | |

OTHER PUBLICATIONS

Scania CV AB, European Application No. 17790012.3, Extended European Search Report, dated Jan. 8, 2020.
International Search Report for International Patent Application No. PCT/SE2017/050392 dated Jun. 19, 2017.
Written Opinion of the International Searching Authority for International Patent Application No. PCT/SE2017/050392 dated Jun. 19, 2017.
Swedish Office Action of International Patent Application No. 1650584-4 dated Jun. 12, 2016.

* cited by examiner

METHOD OF CONTROLLING A COUPLING ARRANGEMENT IN A GEARBOX

CROSS-REFERENCE TO RELATED APPLICATION(S)

This application is a national stage application (filed under 35 § U.S.C. 371) of PCT/SE2017/050392, filed Apr. 21, 2017 of the same title, which, in turn claims priority to Swedish Application No. 1650584-4, filed Apr. 29, 2016 of the same title; the contents of each of which are hereby incorporated by reference.

FIELD OF THE INVENTION

The present invention relates to a method of controlling a coupling arrangement in a gearbox, a coupling arrangement, a gearbox with such a coupling arrangement, and a vehicle with such a gearbox according to the appended claims.

BACKGROUND OF THE INVENTION

Vehicles, and in particular heavy goods vehicles, e.g. trucks and buses, are usually equipped with a gearbox connected to a power source such as an internal combustion engine, an electric engine or a combination thereof. The gearbox may be automatic, manual or a combination thereof, which is provided with one or more actuating cylinders, which serves to shift gears in the gearbox. The actuating cylinders control the engagement and disengagement of gear wheels on different shafts in the gearbox, so that the appropriate gear is obtained. The actuating cylinders may be of pneumatic, hydraulic or electric type and should be designed as small as possible due to the restricted space in the gearbox.

The transmission in trucks often comprises an automated manual transmission, which includes a large number of interacting components and which is controlled by an electronic control device to achieve automatic shifting of gears. One or more electronic sensors in the vehicle obtains information about the operating condition of the vehicle and provides signals to valves, which supply compressed air or hydraulic oil to the actuating cylinders, which thus control the engagement and disengagement of the gear wheels in the gearbox, so that shifting to appropriate gears are obtained.

In gearboxes of this type, the synchronization devices, comprising conical synchronization rings and coupling rings, may be replaced by coupling arrangements comprising toothed coupling sleeves, which are displaced axially in order to engage with the gear wheels placed on input and main shafts in the gearbox. Each gear wheel placed on the input and main shafts are engaged with corresponding gear wheel elements, which are firmly attached to another shaft, such as a lay shaft. On shifting, the coupling sleeve is displaced axially in order to engage with coupling teeth arranged on a selectable gear wheel, in order to connect the gear wheel to, and rotation lock it, on the input or main shaft.

The coupling sleeve may axially displaced in one direction be by means of a pneumatic element and in the opposite direction by means of a spring. An axially directed force from the pneumatic element acting on the coupling sleeve will overcome a spring force from the spring and as a result displace the coupling sleeve axially in the direction of the force from the pneumatic element. When the force from the pneumatic element is relieved the coupling sleeve is displaced axially in the direction of the spring force.

However, the coupling sleeve may be used to connect and disconnect rotatable elements to and from each other in a gearbox of a vehicle, which gearbox forms part of a powertrain in the vehicle. When a force from the pneumatic element has been applied on the coupling sleeve and the coupling sleeve has been displaced in order to connect the rotatable elements a torque from a power source in the powertrain will generate a reaction force which fixates the coupling sleeve on the rotatable elements. If the torque from a power source is large enough the force from the pneumatic element may be relieved and the coupling sleeve will be fixed in the axially direction due to the reaction force.

For security reasons the rotatable elements should be disconnected if the pneumatic element fails or other components in the vehicle fails which controls the pneumatic element. Thus, if the air pressure in the vehicle suddenly drops and the maneuvering abilities of the vehicle are severely affected the rotatable elements in the gearbox are disconnected by means of the spring acting on the coupling sleeve when the torque from power source reduces, so that the driving force from a power source, such as an internal combustion engine, is not transferred to the driving wheels of the vehicle.

However, during some operation modes of the vehicle the torque from the power source may not be large enough to generate a reaction force, which is larger than the spring force acting on the coupling sleeve. Also, due to vibrations and oscillations in the coupling arrangement there is a possibility that the spring force will overcome the reaction force There may also be some misalignment between the coupling sleeve and the rotatable elements that is connected by means of the coupling sleeve. As a result the coupling sleeve may be displaced axially by the spring force and the rotatable elements will be disconnected.

The document WO 2007061348 discloses a device for preventing gear hopout in a tooth clutch in a vehicle transmission. The tooth clutch comprises an engaging sleeve. Axial displacement of the engaging sleeve is carried out by a shift actuator system, which is activated at some cases when said tooth clutch is in an engaged state in order to prevent gear hopout. Thus, according to this prior art the shift actuator system, which is normally activated during a shift of gears, is activated in an engaged state in order to prevent a gear hopout.

The document WO 2014098657 discloses a clutch arrangement comprising a shift piston and a spring element for forcing the shift piston towards a neutral position. Said shift piston is hydraulically actuated and is arranged to be displaced in an axial direction relative to a first gear and a second gear, so that said shift piston has a first axial position in which it meshes with the first gear, a second axial position in which it meshes with the second gear and a third, neutral position.

SUMMARY OF THE INVENTION

Despite prior art, there is a need to develop a coupling arrangement, which is retained in an engaged position. Also, there is a need to develop a coupling arrangement, in which a coupling sleeve is returned to an engaged position if the coupling sleeve unintentionally leaves the engaged position.

An object of the present invention is thus to provide a coupling arrangement, which is retained in an engaged position. Another object of the present invention is to provide a coupling arrangement, in which a coupling sleeve is returned to an engaged position if the coupling sleeve unintentionally leaves the engaged position.

The herein mentioned objects are achieved by a method of controlling a coupling arrangement in a gearbox, a coupling arrangement, a gearbox with such a coupling arrangement, and a vehicle with such a gearbox according to the independent claims.

According to an aspect of the invention the method of controlling a coupling arrangement in a gearbox, comprising a coupling sleeve, which is axially displaceable between a first and second position;

a first and second rotatable element, which are connectable to and disconnectable from each other by means of the coupling sleeve;

a first power source connected to the first rotatable element;

a second power source connected to the second rotatable element;

a first engagement means arranged on the first rotatable element;

a second engagement means arranged on the second rotatable element;

a third engagement means arranged on the coupling sleeve;

the first and second engagement means are configured to transfer torque between the first and second rotatable element via the third engagement means arranged on the coupling sleeve, and the first and second engagement means are configured to allow an axial displacement of the third engagement means along the first and second engagement means. The method comprises the steps of:

a. displacing the coupling sleeve to the second position by applying a first force on the coupling sleeve in the direction from the first position to the second position, which overcomes a spring force acting on the coupling sleeve in the direction from the second position to the first position;

b. relieving the first force on the coupling sleeve when the coupling sleeve is in the second position, and when a reaction force acting on the coupling sleeve overcomes the spring force acting on the coupling sleeve, which reaction force is a result of the torque transferred by the third engagement means arranged on the coupling sleeve;

c. applying the first force on the coupling sleeve in the direction from the first position to the second position if the coupling sleeve is leaving the second position; and d. reducing the torque transferred by the coupling sleeve by means of the second power source.

When the coupling sleeve has been displaced to the second position in order to connect the rotatable elements the coupling sleeve will transfer torque between the rotatable elements via the engagement means. Due to vibrations and oscillations in the coupling arrangement and some possible misalignment between the coupling sleeve and the rotatable elements the spring force may overcome the reaction force and the coupling sleeve will move away from the second position.

Since the reaction force which fixates the coupling sleeve on the rotatable elements may be larger than the first force the coupling sleeve cannot be axially displaced. According to the invention the torque transferred by the coupling sleeve will be reduced by means of the second power source if the coupling sleeve is not axially displaced. The torque exerted by the second power source on the second rotatable element will thus reduce the influence of the torque generated by means of the internal combustion engine. As a result, the reaction force will be reduced which means that the first force may overcome the spring force. As a result, the coupling sleeve may be displaced in the direction from the first position to the second position and thus be returned to the second position.

According to a further aspect of the invention, the method comprises the further step of:

e) increasing the torque transferred by the coupling sleeve by means of the first and/or second power source.

When the coupling sleeve has been displaced in the direction from the first position to the second position and been returned to the second position the torque over the coupling sleeve may be increased.

According to a further aspect of the invention the method comprises the further step of:

f) returning to step b) when the coupling sleeve is in the second position.

If the coupling sleeve moves away from the second position the method steps b)-e) for returning the coupling sleeve to the second position above will be repeated.

Before step b) the method, according to a further aspect of the invention, comprises the further step of:

g) detecting the axial position of the coupling sleeve by means of a position detector element.

The position detector element will detect if the coupling sleeve moves away from the second position unintentionally. Thus, the method steps b)-e) for returning the coupling sleeve to the second position will take effect.

According to a further aspect of the invention, the step d) is performed only if the coupling sleeve will not reach the second position when the first force is applied on the coupling sleeve.

If the first force is strong enough to overcome the spring force and the reaction force the coupling sleeve will be displaced to the second position without the need of reducing the torque transferred by the coupling sleeve by means of the second power source.

According to a further aspect of the invention the first, second and third engagement means are splines elements forming a splines connection between the coupling sleeve and the first and second rotatable element.

The splines connection allows an axial displacement of the coupling element and also allows the coupling element to transfer torque between the rotatable elements.

Further advantages of the invention appear from the following detailed description.

BRIEF DESCRIPTION OF THE DRAWINGS

Below is a description of, as examples, preferred embodiments of the invention with reference to the enclosed drawings, in which.

DETAILED DESCRIPTION OF THE INVENTION

Figure 1:
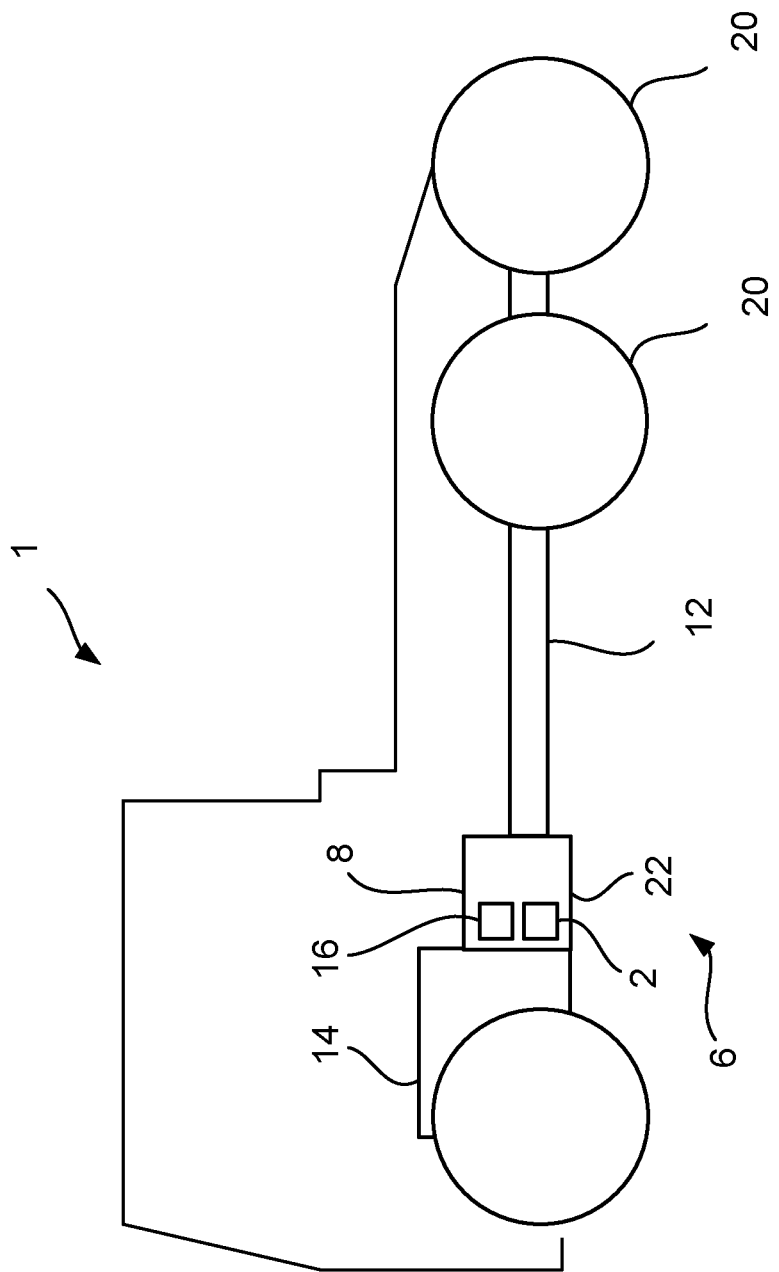
FIG. 1 schematically illustrates a vehicle provided with a coupling arrangement according to the invention.

FIG. 1 schematically illustrates a vehicle 1 provided with a coupling arrangement 2 according to the invention. The vehicle 1 includes a powertrain 6, which comprises a power source 14, 16 a gearbox 8 and a propeller shaft 12. The power source 14, 16 is coupled to the gearbox 8, and comprises an internal combustion engine 14 or an electrical machine 16 or a combination thereof. The gearbox 8 is further connected to drive wheels 20 of the vehicle 1 via the propeller shaft 12. The gearbox 8 is surrounded by a gearbox housing 22.

Figure 2:
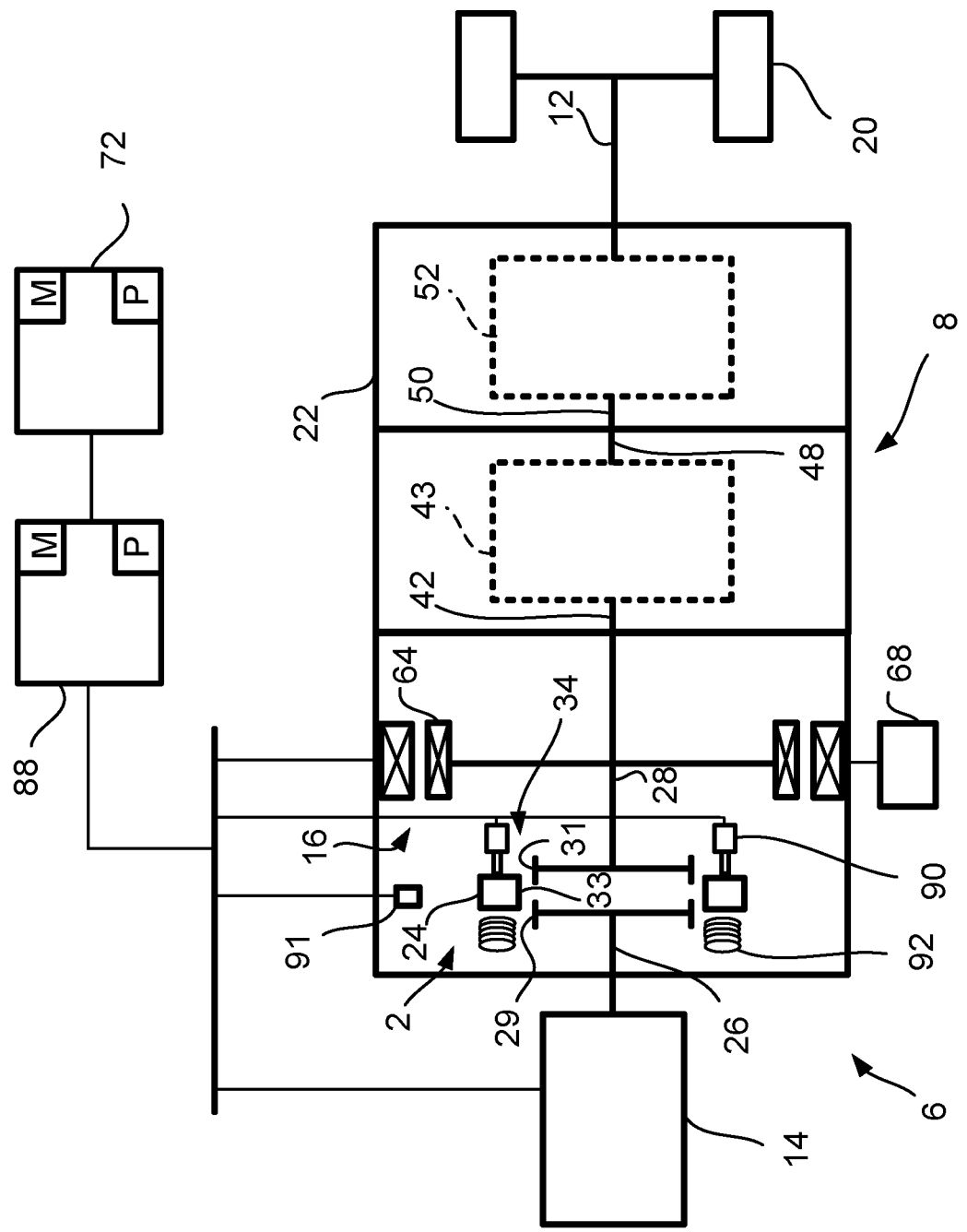
FIG. 2 shows a sectional view of a gearbox provided with a coupling arrangement according to the invention.

FIG. 2 shows a sectional view of the gearbox 8 provided with a coupling arrangement 2 according to the invention. The internal combustion engine 14 is connected to the gearbox 8 via the coupling arrangement 2, which comprises an axially movable coupling sleeve 24. The axially movable coupling sleeve 24 is displaced axially in order to be brought into engagement with a first rotatable element 26, such as an output shaft 26 of the internal combustion engine 14 and a second rotatable element 28, such as an intermediate shaft 28 in the gearbox 8.

A first engagement means 29 is arranged on the first rotatable element 26, a second engagement means 31 is arranged on the second rotatable element 28 and a third engagement means 33 is arranged on the first coupling sleeve 24. The first and second engagement means 29, 31 are configured to transfer torque $T_S$ between the first and second rotatable element 26, 28 via the third engagement means 33 arranged on the coupling sleeve 24. Also, the first and second engagement means 29, 31 are configured to allow an axially displacement of the third engagement means 33 along the first and second engagement means 29, 31. According to an embodiment of the invention the first, second and third engagement means 29, 31, 33 are splines, so that the axially movable coupling sleeve 24 engages the output shaft 26 of the internal combustion engine 14 and the intermediate shaft 28 in the gearbox 8 by means of a splines connection 34.

In a first axial position of the axially movable coupling sleeve 24, the output shaft 26 of the internal combustion engine 14 is disengaged from the intermediate shaft 28. In this axially disengaged position, the axially movable coupling sleeve 24 is engaged only with the intermediate shaft 28 and will rotate together with the intermediate shaft 28 by means of the splines connection 34 between the axially movable coupling sleeve 24 and the intermediate shaft 28. In a second axial position of the axially movable coupling sleeve 24 the output shaft 26 of the internal combustion engine 14 and the intermediate shaft 28 are engaged by means of the axially movable coupling sleeve 24. This second axial position of the axially movable coupling sleeve 24 is illustrated in FIG. 2.

The intermediate shaft 28 is connected to an input shaft 42 of a main gearbox 43. An output shaft 48 of the main gearbox 43 is connected to an input shaft 50 of a range gearbox 52, which is schematically disclosed in FIG. 2. The range gearbox 52 is connected to the drive wheels 20 of the vehicle 1.

The electrical machine 16 is arranged to add torque to the powertrain 6 but also to brake the powertrain 6. A rotor 64 of the electrical machine 16 is connected to the intermediate shaft 28. The electrical machine 16 may be designed to provide enough power and torque to the driving wheels 8 for propulsion of the vehicle 1 without using the internal combustion engine 14. Power to the electrical machine 16 may be provided from an energy storage 68 such as an electrochemical energy storage arranged in the vehicle 1 or from an external energy storage such as wires or other electrical conducting means (not disclosed) in the environment where the vehicle 1 is used. The energy storage 68 may also receive electrical power from the electrical machine 16 when the electrical machine 16 generates brake torque on the input shaft 42 of the main gearbox 43.

An electronic control unit 88 is coupled to the gearbox 8, the internal combustion engine 14, the electrical machine 16 and to a pneumatic element 90. A position detecting element 91 is connected to the control unit 88. The position detecting element 91 shown in FIG. 2 is arranged for detecting the axial position of the coupling sleeve 24. Thus, the first and second position of the coupling sleeve 24 and also any position there between may be detected by means of the position detecting element 91. A number of not shown speed sensors in the gearbox 8, and in the internal combustion engine 14 may be connected to the control unit 88. Another computer 72 may also be connected to the control unit 88. The control unit 88 may be a computer 72 with appropriate software for this purpose. The control unit 88 and/or the computer 72 comprise a computer program P, which can include routines to control the gearbox 8. The program P may be stored in an executable form or compressed form in a memory M and/or in a read/write memory. Preferably there is provided a computer program product comprising a program code stored on a, by a computer readable medium for performing gear shifting in the gearbox 8, when said program is run on the control unit 88 or another computer 72 connected to the control unit 88. Said code may be non-volatile, stored in said computer readable medium.

The pneumatic element 90 is by means of an air pressure arranged to generate a first force $F_1$ on the coupling sleeve 24 to axially displace the coupling sleeve 24 in the direction from the first position to the second position in order to connect the first and second rotatable element 26, 28. A spring 92 is arranged, by means of its spring force $F_S$, to axially displace the coupling sleeve 24 in the direction from the second position to the first position in order to disconnect the first and second rotatable element 26, 28. The axial displacement of the axially movable coupling sleeve 24 may also be provided with one or more actuating cylinders (not disclosed), which serves to axially displace the coupling sleeve 24 between the first and second position. Such actuating cylinders may be of pneumatic, hydraulic; or electric type.

Figure 3A:
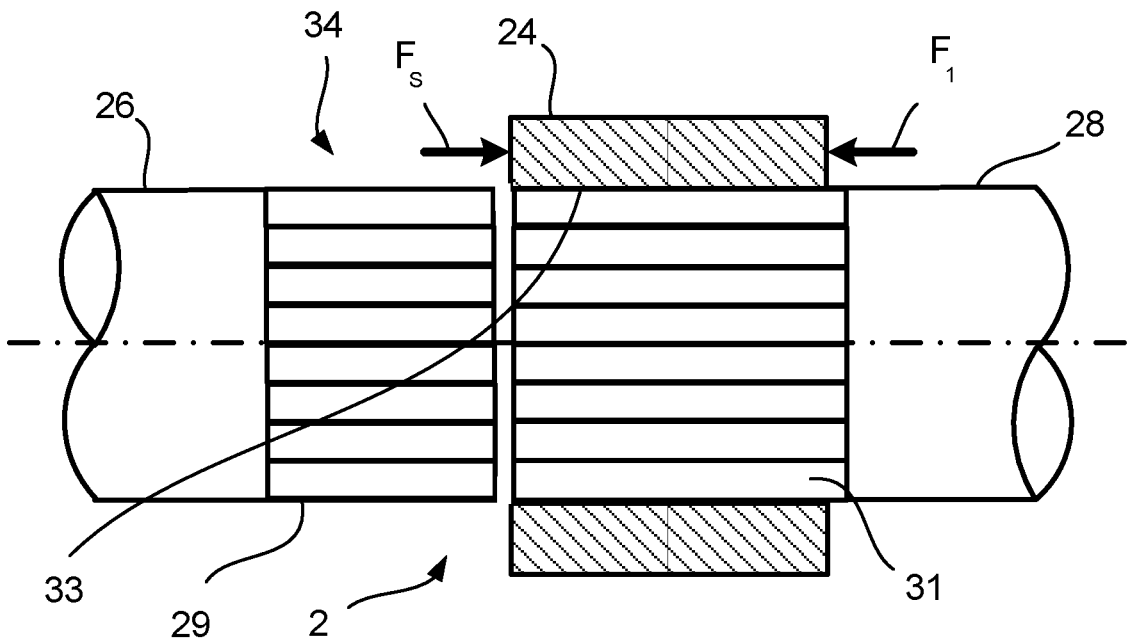
FIGS. 3a and 3b show sectional views of a coupling arrangement in a first and second position according to the invention.
Figure 3B:
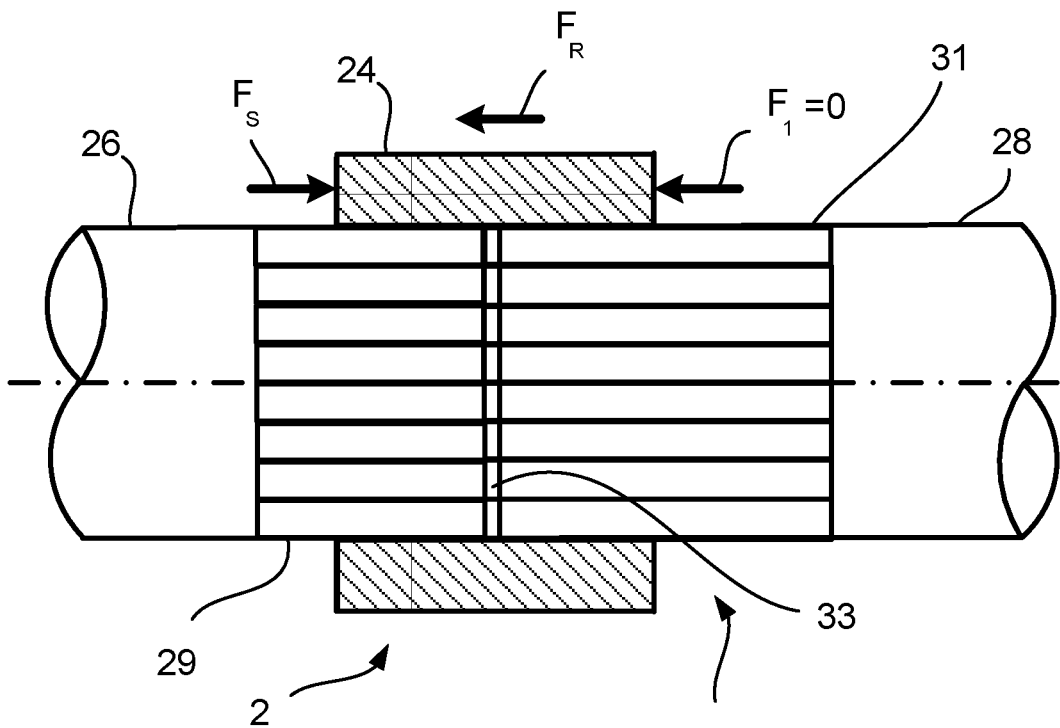
Figure 4:
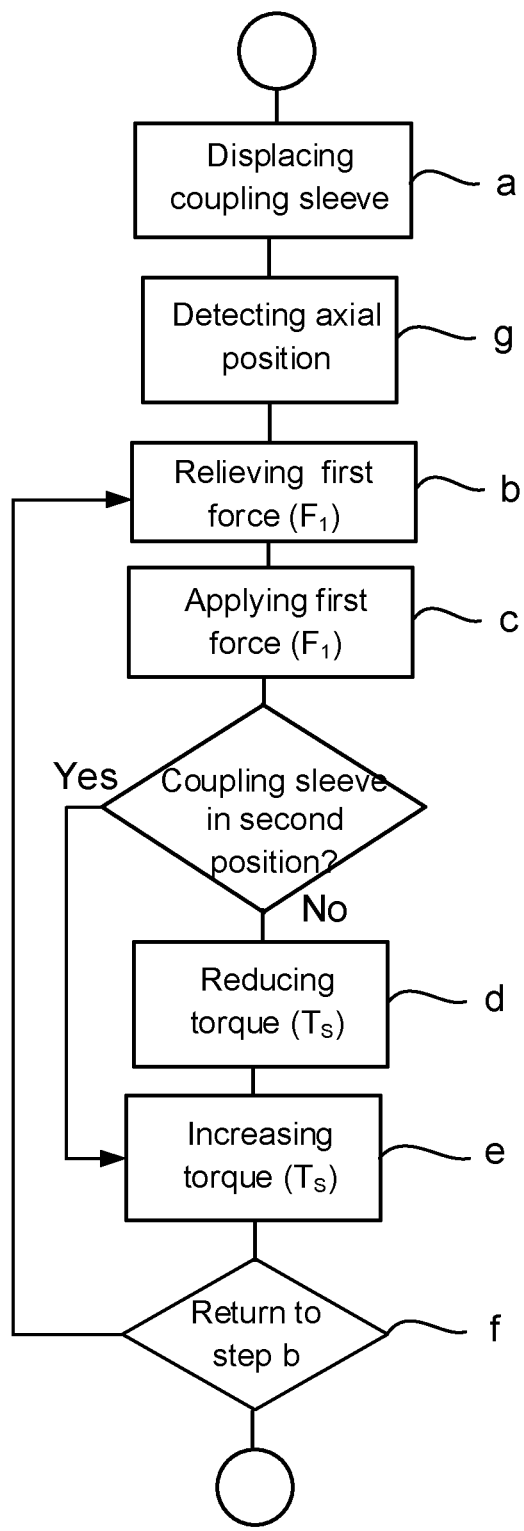
FIG. 4 shows a flow diagram of a method for controlling the gearbox according to the invention.

FIGS. 3a and 3b show sectional views of the coupling arrangement 2 in a first and second position according to the invention. In FIG. 3a the coupling sleeve 24 is in the first, disengaged position and in FIG. 3b the coupling sleeve 24 is in the second, engaged position.

According to the embodiment shown in FIGS. 3a and 3b the first, second and third engagement means 29, 31, 33 are splines, so that the axially movable coupling sleeve 24 engages the output shaft 26 of the internal combustion engine 14 and the intermediate shaft 28 in the gearbox 8 by means of the splines connection 34.

In the first, axially disengaged position, the axially movable coupling sleeve 24 is engaged only with the intermediate shaft 28 and will rotate together with the intermediate shaft 28 by means of the splines connection 34 between the axially movable coupling sleeve 24 and the intermediate shaft 28. The spring force $F_S$ from the spring 92, acts on the coupling sleeve 24 in the direction from the second position to the first position in order to disconnect the first and second rotatable element 26, 28. The first force $F_1$ emanating from the air pressure from the pneumatic element 90 which acts on the coupling sleeve 24 is zero or substantially zero when the coupling sleeve 24 is in the first position.

In FIG. 3b the axially movable coupling sleeve 24 has been displaced axially to the second position in order to engage the output shaft 26 of the internal combustion engine 14 with the intermediate shaft 28 in the gearbox 8. The axial displacement of the coupling sleeve 24 has been provided by increasing the first force $F_1$, so that it overcomes the spring force $F_S$, so that coupling sleeve 24 is displaced in the direction from the first position to the second position in order to connect the first and second rotatable element 26, 28. Such and axially displacement of the coupling sleeve 24 is possible when the speed of first and second rotatable elements 26, 28 has been substantially synchronized or when the first and second rotatable elements 26, 28 are in a stand still condition.

When the coupling sleeve 24 has been displaced to the second position in order to connect the rotatable elements 26, 28 the coupling sleeve 24 will transfer a torque Ts between the rotatable elements 26, 28. The torque Ts is generated by the internal combustion engine 14 and will generate a reaction force $F_R$ in the splines connection 34, which fixates the coupling sleeve 24 on the rotatable elements 26, 28. If the torque from the internal combustion engine 14 is large enough the force from the pneumatic element 90 may be relieved and the coupling sleeve 24 will be fixed in the axially direction due to the reaction force $F_R$.

However, the coupling sleeve 24 will move away from the second position if the torque $T_S$ transferred by the coupling sleeve 24 is not large enough to generate a reaction force $F_R$ which is larger than the spring force $F_S$ acting on the coupling sleeve 24. Also, due to vibrations and oscillations in the coupling arrangement 2 and some possible misalignment between the coupling sleeve 24 and the rotatable elements 26, 28 there the spring force $F_S$ may overcome the reaction force $F_R$ and the coupling sleeve 24 will move away from the second position. As a result the coupling sleeve 24 may be displaced axially by the spring force $F_S$ and the rotatable elements 26, 28 will be disconnected.

This problem may be solved by activating the pneumatic element 90, so that the first force $F_1$ overcomes the spring force $F_S$. As a result the coupling sleeve 24 may be displaced in the direction from the first position to the second position and thus be returned to the second position.

However, if the reaction force $F_R$ that fixates the coupling sleeve 24 on the rotatable elements 26, 28, is larger than the first force $F_1$ generated by the air pressure from the pneumatic element 90 the coupling sleeve 24 will not be axially displaced. According to the invention the torque $T_S$ transferred by the coupling sleeve 24 will be reduced by means of the electrical machine 16 if the coupling sleeve 24 is not axially displaced. Since the electrical machine 16 is arranged to exert torque on the intermediate shaft 28 it is possible to activate the electrical machine 16 and reduce the torque $T_S$ transferred by the coupling sleeve 24. The torque exerted by the electrical machine 16 on the intermediate shaft 28 will thus reduce the influence of the torque generated by means of the internal combustion engine 14. As a result, the reaction force $F_R$ will be reduced which means that the first force $F_1$ may overcome the spring force $F_S$. As a result, the coupling sleeve 24 may be displaced in the direction from the first position to the second position and thus be returned to the second position.

The method of controlling the coupling arrangement 2 in the gearbox 8, comprises the steps of:

a. displacing the coupling sleeve 24 to the second position by applying a first force $F_1$ on the coupling sleeve 24 in the direction from the first position to the second position, which overcomes a spring force $F_S$ acting on the coupling sleeve 24 in the direction from the second position to the first position;

b. relieving the first force $F_1$ on the coupling sleeve 24 when the coupling sleeve 24 is in the second position, and when a reaction force $F_R$ acting on the coupling sleeve 24 overcomes the spring force $F_S$ acting on the coupling sleeve 24, which reaction force $F_R$ is a result of the torque $T_S$ transferred by the third engagement means 33 arranged on the coupling sleeve 24;

c. applying the first force $F_1$ on the coupling sleeve 24 in the direction from the first position to the second position if the coupling sleeve 24 is leaving the second position; and d. reducing the torque $T_S$ transferred by the coupling sleeve 24 by means of the second power source 16.

According to the invention the torque $T_S$ transferred by the coupling sleeve 24 will be reduced by means of the second power source 16 if the coupling sleeve 24 is not axially displaced when applying the first force $F_1$. The torque exerted by the second power source 16 on the second rotatable element 28 will thus reduce the influence of the torque generated by means of the a first power source 14. As a result, the reaction force $F_R$ will be reduced which means that the first force $F_1$ may overcome the spring force $F_S$. As a result, the coupling sleeve 24 may be displaced in the direction from the first position to the second position and thus be returned to the second position.

According to an embodiment, the method comprises the further step of:

e) increasing the torque $T_S$ transferred by the coupling sleeve 24 by means of the first and/or second power source 14, 16.

According to a further embodiment, the method comprises the further step of:

f) returning to step b) when the coupling sleeve 24 is in the second position.

Before step b) an embodiment of the method comprises the further step of:

g) detecting the axial position of the coupling sleeve 24 by means of a position detector element 91. The position detector element 91 will detect when the coupling sleeve 24 is in the second position, and also detect if the coupling sleeve 24 moves away from the second position. Thus, the method steps b)-e) for returning the coupling sleeve 24 to the second position will take effect.

Step d) is according to an embodiment of the method performed only if the coupling sleeve 24 will not reach the second position when the first force $F_1$ is applied on the coupling sleeve 24.

According to a further embodiment the method the first, second and third engagement means 29, 31, 33 are splines elements forming a splines connection 34 between the coupling sleeve 24 and the first and second rotatable element 26, 28.

According to an embodiment of the invention the first force $F_1$ may be applied when the torque $T_S$ transferred by the third engagement means 33 is below a predetermined value due to driving characteristics of the vehicle 1.

The components and features specified above may within the framework of the invention be combined between the different embodiments specified.

The invention claimed is:

1. A method of controlling a coupling arrangement in a gearbox, comprising: a coupling sleeve, which is axially displaceable between a first and second position; a first and second rotatable element, which are connectable to and disconnectable from each other by means of the coupling sleeve; a first power source connected to the first rotatable element; a second power source connected to the second rotatable element; a first engagement means arranged on the first rotatable element; a second engagement means arranged on the second rotatable element a third engagement means arranged on the coupling sleeve; the first and second engagement means are configured to transfer torque between the first and second rotatable element via the third engagement means arranged on the coupling sleeve, and the first and second engagement means are configured to allow an axial displacement of the third engagement means along the first and second engagement means, said method comprising:
 a) displacing the coupling sleeve to the second position by applying a first force on the coupling sleeve in a direction from the first position to the second position, which overcomes a spring force acting on the coupling sleeve in a direction from the second position to the first position;
 b) relieving the first force on the coupling sleeve when the coupling sleeve is in the second position, and when a reaction force acting on the coupling sleeve overcomes the spring force acting on the coupling sleeve, which reaction force is a result of the torque transferred by the third engagement means arranged on the coupling sleeve;
 c) applying the first force on the coupling sleeve in the direction from the first position to the second position if the coupling sleeve is leaving the second position; and
 d) reducing the torque transferred by the coupling sleeve by means of the second power source.

2. The method according to claim 1, further comprising:
 e) increasing a torque transferred by the coupling sleeve by means of the first and/or second power source.

3. The method according to claim 2, further comprising:
 f) returning to step b) when the coupling sleeve is in the second position.

4. The method according to claim 1, further comprising before step b):
 g) detecting the axial position of the coupling sleeve by means of a position detector element.

5. The method according to claim 1, wherein step d) is performed only if the coupling sleeve will not reach the second position, when the first force is applied on the coupling sleeve.

6. The method according to claim 1, wherein the first, second and third engagement means are splines elements forming a splines connection between the coupling sleeve and the first and second rotatable element.

7. A coupling arrangement comprising:
 a coupling sleeve, which is axially displaceable between a first and second position;
 a first and second rotatable element, which are connectable to and disconnectable from each other by means of the coupling sleeve;
 a first power source connected to the first rotatable element; a second power source connected to the second rotatable element;
 a first engagement means arranged on the first rotatable element; a second engagement means arranged on the second rotatable element;
 a third engagement means arranged on the coupling sleeve;
 the first and second engagement means are configured to transfer torque between the first and second rotatable element via the third engagement means arranged on the coupling sleeve, and the first and second engagement means are configured to allow an axial displacement of the third engagement means along the first and second engagement means, wherein the coupling arrangement is controlled by:
 a) displacing the coupling sleeve to the second position by applying a first force on the coupling sleeve in a direction from the first position to the second position, which overcomes a spring force acting on the coupling sleeve in a direction from the second position to the first position;
 b) relieving the first force on the coupling sleeve when the coupling sleeve is in the second position, and when a reaction force acting on the coupling sleeve overcomes the spring force acting on the coupling sleeve, which reaction force is a result of the torque transferred by the third engagement means arranged on the coupling sleeve;
 c) applying the first force on the coupling sleeve in the direction from the first position to the second position if the coupling sleeve is leaving the second position; and
 d) reducing the torque transferred by the coupling sleeve by means of the second power source.

8. A gearbox comprising a coupling arrangement comprising:
 a coupling sleeve, which is axially displaceable between a first and second position;
 a first and second rotatable element, which are connectable to and disconnectable from each other by means of the coupling sleeve;
 a first power source connected to the first rotatable element; a second power source connected to the second rotatable element;
 a first engagement means arranged on the first rotatable element; a second engagement means arranged on the second rotatable element;
 a third engagement means arranged on the coupling sleeve;
 the first and second engagement means are configured to transfer torque between the first and second rotatable element via the third engagement means arranged on the coupling sleeve, and the first and second engagement means are configured to allow an axial displacement of the third engagement means along the first and second engagement means, wherein the coupling arrangement is controlled by:
 a) displacing the coupling sleeve to the second position by applying a first force on the coupling sleeve in a direction from the first position to the second position, which overcomes a spring force acting on the coupling sleeve in a direction from the second position to the first position;
 b) relieving the first force on the coupling sleeve when the coupling sleeve is in the second position, and when a reaction force acting on the coupling sleeve overcomes the spring force acting on the coupling sleeve, which reaction force is a result of the torque transferred by the third engagement means arranged on the coupling sleeve;
 c) applying the first force on the coupling sleeve in the direction from the first position to the second position if the coupling sleeve is leaving the second position; and
 d) reducing the torque transferred by the coupling sleeve by means of the second power source.

9. A vehicle comprising a gearbox having a coupling arrangement comprising:
 a coupling sleeve, which is axially displaceable between a first and second position;

a first and second rotatable element, which are connectable to and disconnectable from each other by means of the coupling sleeve;
a first power source connected to the first rotatable element; a second power source connected to the second rotatable element;
a first engagement means arranged on the first rotatable element; a second engagement means arranged on the second rotatable element;
a third engagement means arranged on the coupling sleeve;
the first and second engagement means are configured to transfer torque between the first and second rotatable element via the third engagement means arranged on the coupling sleeve, and the first and second engagement means are configured to allow an axial displacement of the third engagement means along the first and second engagement means, wherein the coupling arrangement is controlled by:
  a) displacing the coupling sleeve to the second position by applying a first force on the coupling sleeve in a direction from the first position to the second position, which overcomes a spring force acting on the coupling sleeve in a direction from the second position to the first position;
  b) relieving the first force on the coupling sleeve when the coupling sleeve is in the second position, and when a reaction force acting on the coupling sleeve overcomes the spring force acting on the coupling sleeve, which reaction force is a result of the torque transferred by the third engagement means arranged on the coupling sleeve;
  c) applying the first force on the coupling sleeve in the direction from the first position to the second position if the coupling sleeve is leaving the second position; and
  d) reducing the torque transferred by the coupling sleeve by means of the second power source.

10. A computer program product comprising program code stored on a non-transitory computer-readable medium, said computer program product for controlling a coupling arrangement in a gearbox, comprising: a coupling sleeve, which is axially displaceable between a first and second position; a first and second rotatable element, which are connectable to and disconnectable from each other by means of the coupling sleeve; a first power source connected to the first rotatable element; a second power source connected to the second rotatable element; a first engagement means arranged on the first rotatable element; a second engagement means arranged on the second rotatable element; a third engagement means arranged on the coupling sleeve; the first and second engagement means are configured to transfer torque between the first and second rotatable element via the third engagement means arranged on the coupling sleeve, and the first and second engagement means are configured to allow an axial displacement of the third engagement means along the first and second engagement means wherein said computer program code comprises computer instructions to cause said at least one control unit to cause components of the coupling arrangement to perform the following operations:
  a) displacing the coupling sleeve to the second position by applying a first force on the coupling sleeve in a direction from the first position to the second position, which overcomes a spring force acting on the coupling sleeve in a direction from the second position to the first position;
  b) relieving the first force on the coupling sleeve when the coupling sleeve is in the second position, and when a reaction force acting on the coupling sleeve overcomes the spring force acting on the coupling sleeve, which reaction force is a result of the torque transferred by the third engagement means arranged on the coupling sleeve;
  c) applying the first force on the coupling sleeve in the direction from the first position to the second position if the coupling sleeve is leaving the second position; and
  d) reducing the torque transferred by the coupling sleeve by means of the second power source.

* * * * *